(12) United States Patent
Chen et al.

(10) Patent No.: US 8,355,557 B2
(45) Date of Patent: Jan. 15, 2013

(54) SYSTEM AND METHOD FOR DECOMPOSED TEMPORAL FILTERING FOR X-RAY GUIDED INTERVENTION APPLICATION

(75) Inventors: Yunqiang Chen, Plainsboro, NJ (US); Ti-chiun Chang, Princeton Junction, NJ (US); Tong Fang, Morganville, NJ (US); Sandra Knoth, Herzogenaurauch (DE); Stefan Böhm, Oberasbach (DE); Peter Durlak, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 681 days.

(21) Appl. No.: 12/571,487

(22) Filed: Oct. 1, 2009

(65) Prior Publication Data

US 2010/0092061 A1      Apr. 15, 2010

Related U.S. Application Data

(60) Provisional application No. 61/104,339, filed on Oct. 10, 2008.

(51) Int. Cl.
*G06K 9/00* (2006.01)
*A61B 6/02* (2006.01)
*A61B 6/00* (2006.01)

(52) U.S. Cl. ............ 382/132; 382/128; 382/131; 378/4; 378/42; 378/98.11; 378/98.12

(58) Field of Classification Search .................. 382/128, 382/131, 132; 378/4, 98.11, 98.12
See application file for complete search history.

(56) References Cited

U.S. PATENT DOCUMENTS

| | | | | |
|---|---|---|---|---|
| 3,974,386 | A | * | 8/1976 | Mistretta et al. ............ 378/98.11 |
| 4,482,918 | A | * | 11/1984 | Keyes et al. ................ 378/98.11 |
| 5,018,179 | A | * | 5/1991 | Kaneko ...................... 378/98.12 |
| 5,671,263 | A | * | 9/1997 | Ching-Ming ..................... 378/8 |
| 5,671,743 | A | * | 9/1997 | Kawai et al. ................... 600/431 |
| 6,154,518 | A | * | 11/2000 | Gupta ............................. 378/62 |
| 7,346,198 | B2 | * | 3/2008 | Oosawa ........................ 382/128 |
| 2008/0025588 | A1 | * | 1/2008 | Zhang et al. .................. 382/130 |
| 2008/0037844 | A1 | * | 2/2008 | Baumgart ..................... 382/130 |
| 2008/0049994 | A1 | * | 2/2008 | Rognin et al. ................ 382/128 |
| 2008/0205591 | A1 | * | 8/2008 | Ozawa ............................ 378/44 |
| 2009/0010512 | A1 | * | 1/2009 | Zhu et al. ....................... 382/130 |

\* cited by examiner

*Primary Examiner* — Alexander H Taningco
(74) *Attorney, Agent, or Firm* — Donald B. Paschburg

(57) ABSTRACT

A method for temporally filtering medical images during a fluoroscopy guided intervention procedure includes providing a mask image, a fluoroscopy intervention image acquired at a current time during a medical intervention procedure, forming a subtraction image by subtracting the mask image from the intervention image, calculating a motion image of a moving structure in the subtraction image, forming a residual image by subtracting the motion image from the subtraction image, temporally filtering the residual image with a filtered image from a previous time, and adding the motion image to the temporally filtered residual image.

23 Claims, 4 Drawing Sheets

SYSTEM AND METHOD FOR DECOMPOSED TEMPORAL FILTERING FOR X-RAY GUIDED INTERVENTION APPLICATION

CROSS REFERENCE TO RELATED UNITED STATES APPLICATIONS

This application claims priority from "Decomposed Temporal Filtering Method for Roadmap Application", U.S. Provisional Application No. 61/104,339 of Chen, et al., filed Oct. 10, 2008, the contents of which are herein incorporated by reference in their entirety.

TECHNICAL FIELD

This disclosure is directed to methods for digital subtraction in medical images.

DISCUSSION OF THE RELATED ART

Digital subtraction is a common procedure for many medical imaging applications. For example, before a medical intervention procedure, contrast media is injected into blood vessels to highlight the vessels and then flushed away. A fluoroscopy image with vessels highlighted can be obtained, which is known as a mask image. Then, during the intervention, a guide wire may be inserted into the vessels, and a fluoroscopy image of the vessels is obtained in real-time. To highlight the vessel's location, the mask image is subtracted from a current image that shows the presence of guide-wire. The final result is an image of the guide-wire overlaid with the vessels to help a physician position the guide wire. It can be represented as following equation:

$$I_{sub} = I_{cur} - I_{mask}$$

However, since imaging noise on the two images, i.e., the mask image and the current image, is independent of each other, the subtraction result has more noise than either of the two input images:

$$\sigma_{sub}^2 = \sigma_{cur}^2 + \sigma_{mask}^2.$$

Reducing the noise improves image quality. One common way to reduce noise is to apply temporal filtering to average over consecutive frames and hence reduce the noise. An issue with utilizing consecutive frames, however, is preventing ghosting artifacts when there is significant guide wire motion.

Since vessels usually cannot be clearly seen in traditional X-ray fluoroscopy images, contrast media is injected to highlight the vessels. Vessel related intervention procedures are usually divided into several phases. In a first phase, contrast media is injected into the vessels to highlight them. Vessels with contrast media appear darker than the surrounding soft tissues. Then, after a short time, the contrast media is flushed away. During this phase, a mask image can be obtained by taking the minimum intensity of each pixel for all image frames acquired during this phase. A sample mask image is shown in FIG. 1, showing a vessel 11. Then, during the intervention, a guide wire is inserted into the vessel, and an X-ray fluoroscopy is obtained of the guide wire in the vessel. But since the contrast media has been flushed away, the vessels are almost invisible. A sample intervention image of a guide wire 22 can be seen in FIG. 2. To help a physician position the guide wire, the mask image is subtracted from the current intervention image. This operation results in an image with the vessels 31 overlaid with the moving guide wire 32, as shown in FIG. 3. However, as explained above, the subtraction procedure enhances noise and reduces the signal to noise ratio. A noise reduction method may provide better image quality during the intervention.

SUMMARY OF THE INVENTION

Exemplary embodiments of the invention as described herein generally include methods and systems for a decomposed temporal filtering for fluoroscopy guided intervention application that utilize the availability of the mask image to decompose the intervention images into moving structures and static structures. Performing temporal filtering only on static structures can prevent ghosting in traditional temporal filtering. A filtering algorithm according to an embodiment of the invention can be performed in real-time during an intervention procedure, and can be extended to other imaging modalities which utilize digital subtraction procedures.

According to an aspect of the invention, there is provided a method for temporally filtering medical images during a fluoroscopy guided intervention procedure, the method including providing a mask image and a fluoroscopy intervention image acquired at a current time during a medical intervention procedure, forming a subtraction image by subtracting the mask image from the intervention image, calculating a motion image of a moving structure in the subtraction image, forming a residual image by subtracting the motion image from the subtraction image, temporally filtering the residual image with a filtered image from a previous time, and adding the motion image to the temporally filtered residual image.

According to a further aspect of the invention, the method includes normalizing contrast of the mask image and the intervention image, before forming the subtraction image.

According to a further aspect of the invention, contrast is normalized by calculating a log of each image.

According to a further aspect of the invention, the moving structure comprises a guide wire being inserted into a blood vessel during the medical intervention procedure.

According to a further aspect of the invention, calculating a motion image comprises calculating an image that minimizes an objective function that includes a mutual information of the subtraction image and the intervention image.

According to a further aspect of the invention, the mutual information is of the form $MI(I_{sub,t}(x,y) - I_{mov,t}(x,y), I_t(x,y) - I_{mov,t}(x,y))$, where $(x,y)$ is a pixel location, $I_{mov,t}(x,y)$ is the motion image, $I_{sub,t}(x,y)$ is the subtraction image, and $I_t(x,y)$ is the intervention image.

According to a further aspect of the invention, the objective function being minimized includes term proportional to a square of the motion image.

According to a further aspect of the invention, the mutual information is of the form $$MI(N_1, N_2) = \sum_k \|E(f_k(N_1), g_k(N_2)) - E(f_k(N_1)) \cdot E(g_k(N_2))\|^2,$$

where $f_k(N_1) = N_1^k$, $g_k(N_2) = N_2^k$ and $N_1$, $N_2$ represent the first and second arguments of the mutual information, respectively.

According to a further aspect of the invention, the method includes calculating a motion consistent image $\tilde{I}_{mov,t}(x,y) = \arg(\tilde{I}_{mov,t}) \min(\|\tilde{I}_{mov,t}(x,y) - I_{mov,t}(x,y)\|^2 + \lambda \|\tilde{I}_{mov,t}(x,y) - \tilde{I}_{mov,t-1}(x,y)\|^2)$ that constrains the motion image to be substantially constant if the moving structure is not moving, where $\lambda$ is a constant set to 0 when $\|I_{mov,t}(x,y) - \tilde{I}_{mov,t-1}(x,y)\| > \epsilon$, where $\epsilon$ is a threshold for motion detection.

According to a further aspect of the invention, the temporal filtering takes the form $I_t(x,y)=wI_{t-1}(x,y)+(1-w)(I_{sub,t}(x,y)-I_{mov,t}(x,y))$ where (x,y) is a pixel location, $I_{mov,t}(x,y)$ is the motion image, $I_{sub,t}(x,y)$ is the subtraction image, $I_{t-1}(x,y)$ is the filtered image from a previous time, and w is a predetermined weighting factor.

According to another aspect of the invention, there is provided a method of temporally filtering medical images during a fluoroscopy guided intervention procedure, the method including providing a fluoroscopy intervention image of a blood vessel acquired at a current time during a medical intervention procedure and a subtraction image of the blood vessel, calculating a motion image that minimizes an objective function that includes a mutual information of the subtraction image and the intervention image, where the mutual information is of the form $MI(I_{sub,t}(x,y)-I_{mov,t}(x,y), I_t(x,y)-I_{mov,t}(x,y))$, where (x,y) is a pixel location, $I_{mov,t}(x,y)$ is the motion image, $I_{sub,t}(x,y)$ is the subtraction image, and $I_t(x,y)$ is the intervention image, forming a residual image by subtracting the motion image from the subtraction image, and temporally filtering the residual image with a filtered image from a previous time.

According to a further aspect of the invention, the subtraction image comprises providing a mask image and forming the subtraction image by subtracting the mask image from the intervention image, where the mask image is provided before the intervention by injecting a contrast media into the blood vessel and acquiring an image of the highlighted vessels.

According to a further aspect of the invention, the method includes adding the motion image to the temporally filtered residual image.

According to another aspect of the invention, there is provided a program storage device readable by a computer, tangibly embodying a program of instructions executable by the computer to perform the method steps for temporally filtering medical images during a fluoroscopy guided intervention procedure.

DETAILED DESCRIPTION OF EXEMPLARY EMBODIMENTS

Figure 1:
FIG. 1 depicts a sample mask image, according to an embodiment of the invention.
Figure 2:
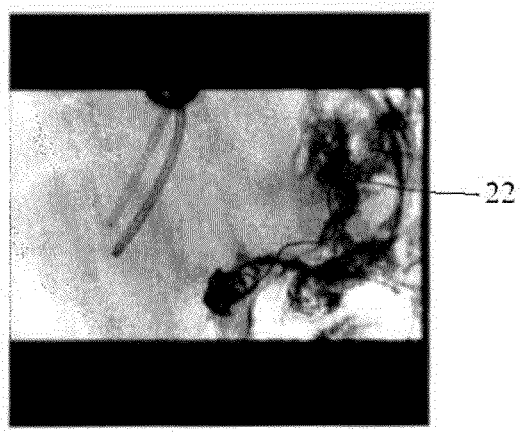
FIG. 2 depicts a sample intervention image of a guide wire, according to an embodiment of the invention.
Figure 3:
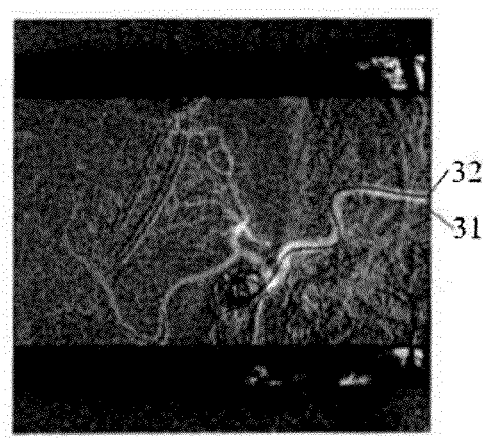
FIG. 3 depicts an image with the vessels overlaid with the moving guide wire, according to an embodiment of the invention.

Exemplary embodiments of the invention as described herein generally include systems and methods for decomposed temporal filtering for fluoroscopy guided intervention procedures. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

In the following disclosure, M(x,y) denotes a mask image as a function of pixel location (x,y), $I_t(x,y)$ refers to the fluoroscopy image acquired during the intervention at time t as a function of pixel location (x,y), and $I_{sub,t}(x,y)$ is the pixel-wise subtraction result of $I_t(x,y)$ and M(x,y).

Figure 4:
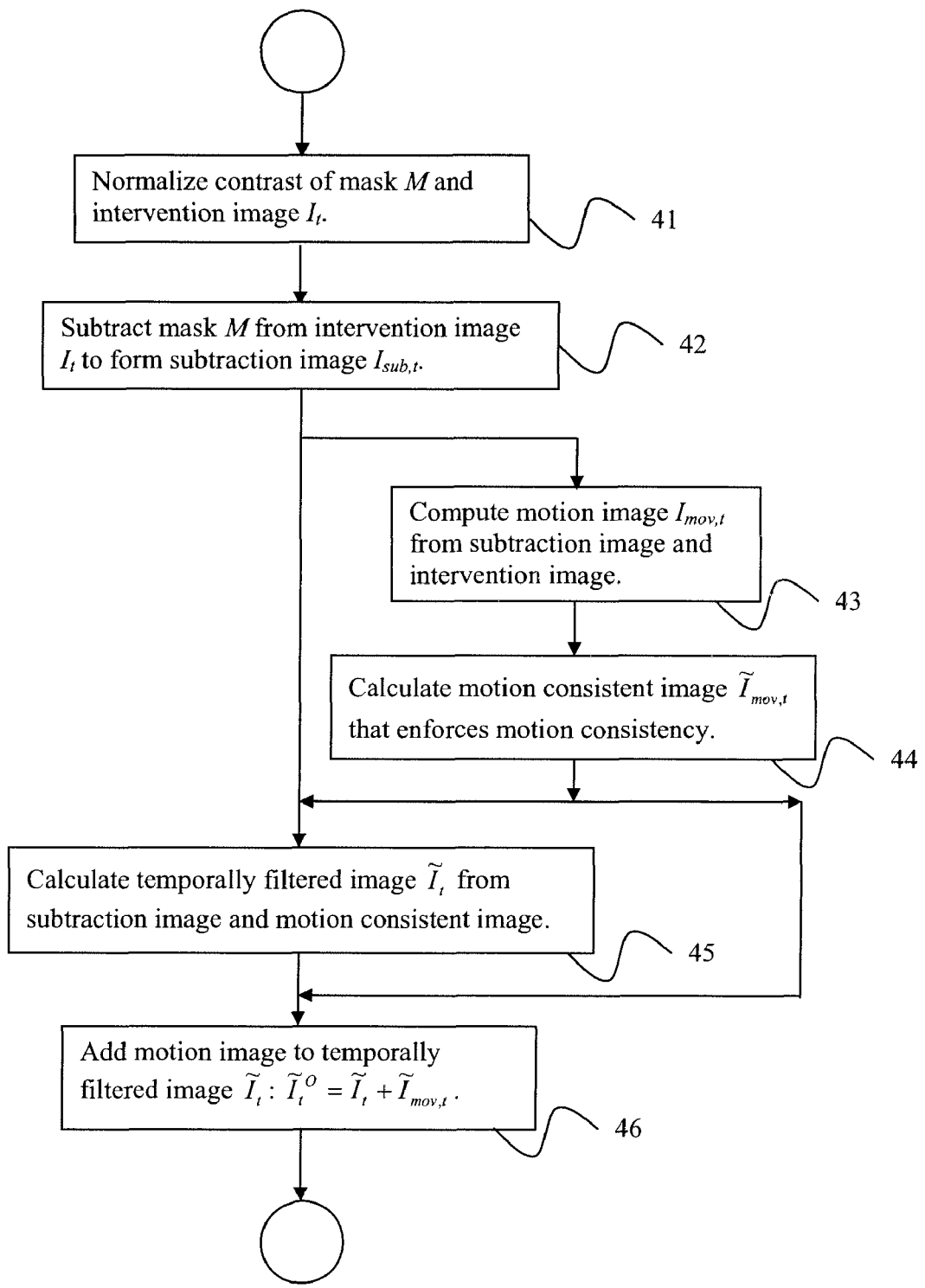
FIG. 4 is a flowchart of a decomposed temporal method according to an embodiment of the invention.

FIG. 4 is a flowchart of a decomposed temporal filtering algorithm according to an embodiment of the invention.

Contrast Normalization

Referring now to FIG. 4, a preliminary step 41 prior to any filtering a normalizing the contrast of the mask image M(x,y) and intervention image $I_t(x,y)$. When an X-ray passes through body tissues, its energy is attenuated with depth in the absorbing material according to a simple exponential function:

$$D = A\exp(-\alpha s)$$

When the X-ray finally hits the detector, its energy is measured and represented as an intensity value I. This value reflects the attenuation through the whole path of the X-ray:

$$I = A \cdot \exp(-\int \alpha_s ds).$$

The attenuation coefficient $\alpha_s$ is different for different tissues. To maintain consistent contrast of the objects (i.e., guide wire or vessels) during the subtraction procedure, the image should be normalized by a log function before subtraction:

$$I_{sub,t}(x,y) = \log(I_t(x,y)) - \log(M(x,y)) \qquad (1)$$

This log-normalization makes the image additive, since before normalization, due to the exponential absorption, the intensity is multiplicative. After this normalization step, a guide wire passing through region of different intensity will have the same intensity, different than the neighborhood. According to some embodiments of the invention, the log-conversion may be performed with a look-up-table. According to other embodiments of the invention, the look-up-table is not an exact log function, but is modified to better handle very dark regions.

Decomposed Filtering

Temporal filtering is a common technique for reducing imaging noise by averaging over consecutive image frames. If there is motion during image acquisition, registration algorithms can be used to compensate for the motion before the temporal filtering.

However, motion compensation is challenging in X-ray fluoroscopy imaging. Since X-rays pass though body tissue, objects inside the body, such as organs, guide wires, soft tissue, etc., are projected and overlaid onto one 2D image as semi-transparent layers. Usually the patient stays static, but the guide wire is moving inside a vessel. Registration algorithms cannot typically register images with multiple transparent layers to compensate the motion because most registration algorithms assume one motion vector at each pixel.

According to an embodiment of the invention, a mask image $M(x,y)$ is used at step 42 to decompose the intervention images $I_t(x,y)$ into two layers, a static body tissue layer and a moving guide wire layer, before the temporal filtering. This scheme can handle the different motion of the body tissue and guide wire, reducing noise while preventing ghosting artifacts caused by the moving guide wire.

Traditionally, direct subtraction, i.e., $I_{sub,t}(x,y)=I_t(x,y)-M(X,y)$, is used to overlay the moving guide wire with mask image of the vessel tree during the intervention procedure, which is noisy due to the subtraction. Directly applying temporal filtering on $I_t(x,y)$ before subtraction or on $I_{sub}(x,y)$ is challenging because the images contain both moving guide wire and static structures.

However, according to an embodiment of the invention, utilization of the original mask image and intervention images can separate the moving structures, i.e., $\tilde{I}_{mov,t}(x,y)$, and remove the moving structures from the images before temporal filtering. After the filtering, the moving structures are recombined with the temporal filtered images to form the final output results. A temporal filtering scheme according to an embodiment of the invention can reduce imaging noise while preventing ghosting artifacts generated by the moving structures.

The detailed steps for separating the moving structures and static structures are described in the following sections.

Separate Moving Layer Based on Mutual Information

The direct subtraction image $I_{sub,t}(x,y)$ contains both moving structures, such as the guide wire, and static structures, such as vessels. A moving structure, such as the guide wire, is inserted during intervention, and hence also exists in the intervention image. Therefore, at step 43, it is possible to estimate the moving structure, $I_{mov,t}(x,y)$ based on a mutual information analysis between a subtraction image $I_{sub,t}(x,y)$ and an intervention image $I_t(x,y)$:

$$I_{mov,t}(x,y) = \arg(I_{mov,t})\min\left( \begin{array}{c} MI(I_{sub,t}(x,y)-I_{mov,t}(x,y), I_t(x,y) - \\ I_{mov,t}(x,y)) + \|I_{mov,t}(x,y)\|^2 \end{array} \right), \quad (2)$$

where MI is the mutual information and $I_{mov,t}(x,y)$ is the motion image of the moving structure at time t. Since the motion image $I_{mov,t}(x,y)$ is inserted during intervention, and is the only common signal between the intervention image $I_t(x,y)$ and the subtraction image $I_{sub,t}(x,y)$, removing the moving structure from the two images should minimize the mutual information between them. The second term is a regularization term that prevents imaging noise from being included in the moving structure.

Mutual information can be computationally intensive to calculate. For more efficient computation, the mutual information term can be approximated according to an embodiment of the invention based on assuming the independence of random variables:

$$E(f(N_1),g(N_2))=E(f(N_1))\cdot E(g(N_2)).$$

where E is an expectation and $N_1$, $N_2$ are the random arguments. Based on this property, one can measure the mutual information, based on the following objective function:

$$MI(N_1, N_2) = \sum_k \|E(f_k(N_1), g_k(N_2)) - E(f_k(N_1))\cdot E(g_k(N_2))\|^2, \quad (3)$$

where $$f_k(N_1)N_1^K, g_k(N_2)=N_2^k.$$

To find an optimal solution, one can take the derivative of the objective function and set it to zero, which will yield an optimal solution.

Enforce Motion Consistency

Apart from the mutual information constraint on the moving structure, there are also temporal constraints. For example, the intensity of a moving guide wire remains substantially constant if it is not moving. But if the guide wire moves, the intensity of the affected pixels changes. This constraint can be enforced at step 44 by optimizing the Do following cost function:

$$\tilde{I}_{mov,t}(x, y) = \arg(\tilde{I}_{mov,t})\min\left( \begin{array}{c} \|\tilde{I}_{mov,t}(x, y) - I_{mov,t}(x, y)\|^2 + \\ \lambda\|\tilde{I}_{mov,t}(x, y) - \tilde{I}_{mov,t-1}(x, y)\|^2 \end{array} \right) \quad (4)$$

where the result is a motion consistent image $\tilde{I}_{mov,t}(x,y)$. The first term in the cost function ensures that the motion consistent image looks like the input, $I_{mov,t}(x,y)$. The second term enforces a similar intensity constraint on the motion consistent image. As described above, the similar intensity constraint should be applied only when the guide wire is not moving. So, $\lambda$ may be to zero if $\|I_{mov,t}(x,y)-\tilde{I}_{mov,t-1}(x,y)\|>\epsilon$, where $\epsilon$ is a threshold for motion detection.

Temporal Filtering

An estimated moving structure can be removed from the direct subtraction image so that and temporal filtering may be applied on the residual image $I_{sub,t}(x,y)-\tilde{I}_{mov,t}(x,y)$. This way, the temporal filtering is free of motion artifacts such as "ghosting". The temporal filter is implemented based on a running average of the input images and the strength of the temporal filter can be controlled by a weighting factor w:

$$\tilde{I}_t(x,y)=w\tilde{I}_{t-1}(x,y)+(1-w)(I_{sub,t}(x,y)-\tilde{I}_{mov,t}(x,y)), \quad (5)$$

where $\tilde{I}_{t-1}(x,y)$ is the temporally filtered image from the previous time step, and $I_{sub,t}(x,y)$ is the subtraction image calculated in step 42. The final output can be obtained at step 46 by adding back the motion consistent image from step 44 as follows:

$$\tilde{I}_t^O(x,y)=\tilde{I}_t(x,y)+\tilde{I}_{mov,t}(x,y). \quad (6)$$

The resulting image $\tilde{I}_t^O(x,y)$ should have significantly reduced image noise while preserving the moving structure without motion artifacts. The temporal filtering of EQ. (5) is exemplary and non-limiting. According to other embodiments of the invention, the temporal filtering involves multiple frames in the sequence. According to other embodiments of the invention, the weighting scheme can be adaptive.

Experimental Results

Figure 5:
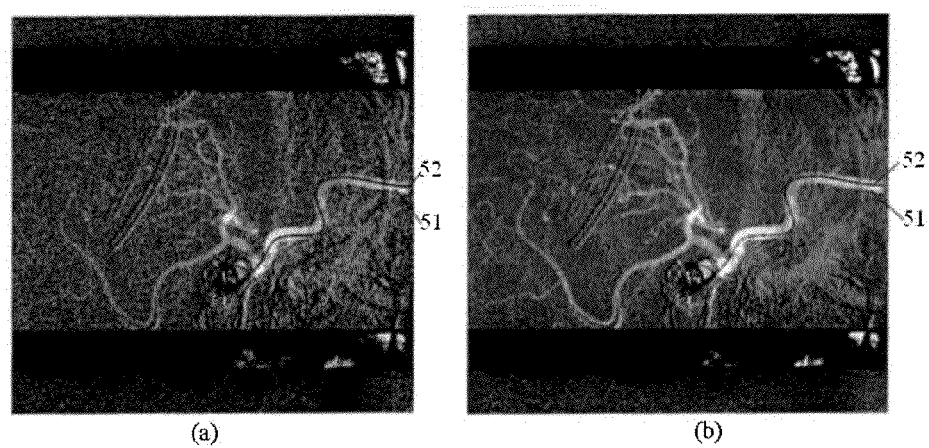
FIGS. 5(a)-(b) compare results of direct subtraction with a subtraction method according to an embodiment of the invention.

An algorithm according to an embodiment of the invention was tested on real image sequences. For a first sequence, a direct subtraction result was compared with a subtraction result according to an embodiment of the invention. The results are shown in FIGS. 5(a)-(b), with FIG. 5(a) depicting a result of directly subtracting a mask image from a current intervention image, while FIG. 5(b) depicts the result of a decomposed subtraction according to an embodiment of the invention. In each image, reference number 51 refers to the vessel, and reference number 52 refers to the guide wire. The figures indicate that weak vessels and the thin guide wire are well preserved and the noise is reduced.

Figure 6:
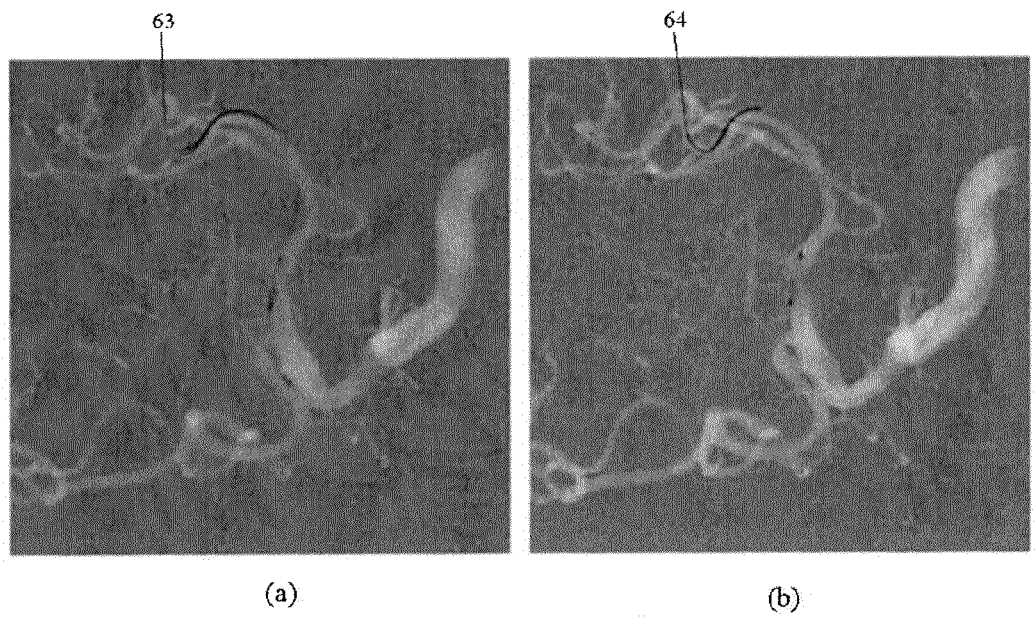
FIGS. 6(a)-(b) compare results of traditional temporal filtering with a decomposed temporary filtering method according to an embodiment of the invention.

Another test compared a filtering method according to an embodiment of the invention with a traditional temporal filtering method. The results are shown in FIGS. 6(a)-(b), with FIG. 6(a) depicting a traditional temporal filtering result, with guide wire 63, while FIG. 6(b) depicts the result of a temporal filtering according to an embodiment of the invention, with guide wire 64. As shown in FIG. 6(a), without the decomposition, it may be seen that the traditional temporal filtering results in some ghosting artifacts around the tip of the guide wire when the guide wire is moving. FIG. 6(b) depicts how a temporal filtering according to an embodiment of the invention that separates the moving structure from the temporal filtering achieves good noise reduction without motion artifacts.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 7:
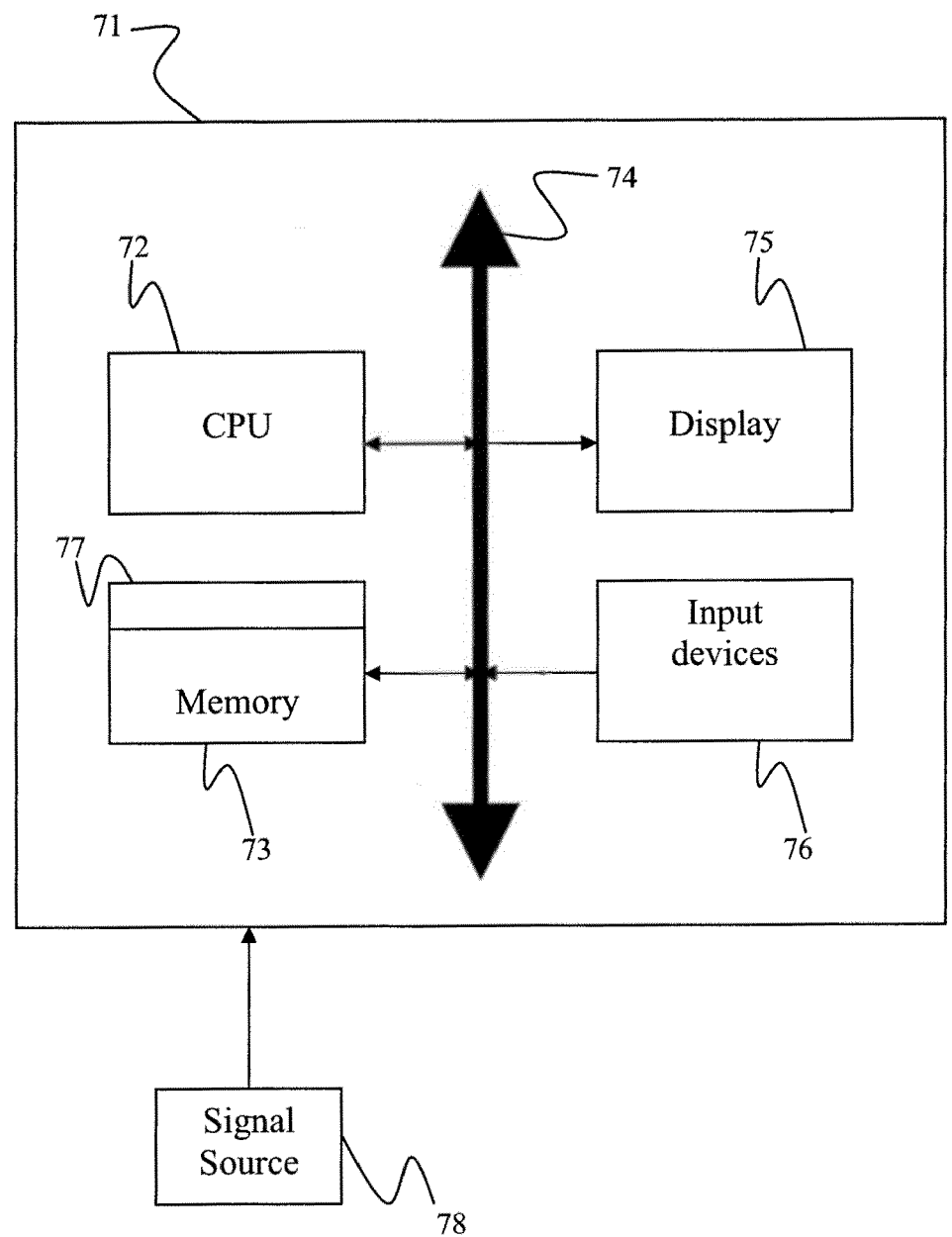
FIG. 7 is a block diagram of an exemplary computer system for implementing a method for decomposed temporal filtering for fluoroscopy guided intervention procedures, according to an embodiment of the invention.

FIG. 7 is a block diagram of an exemplary computer system for implementing a method for decomposed temporal filtering for fluoroscopy guided intervention procedures according to an embodiment of the invention. Referring now to FIG. 7, a computer system 71 for implementing the present invention can comprise, inter alia, a central processing unit (CPU) 72, a memory 73 and an input/output (I/O) interface 74. The computer system 71 is generally coupled through the I/O interface 74 to a display 75 and various input devices 76 such as a mouse and a keyboard. The support circuits can include circuits such as cache, power supplies, clock circuits, and a communication bus. The memory 73 can include random access memory (RAM), read only memory (ROM), disk drive, tape drive, etc., or a combinations thereof. The present invention can be implemented as a routine 77 that is stored in memory 73 and executed by the CPU 72 to process the signal from the signal source 78. As such, the computer system 71 is a general purpose computer system that becomes a specific purpose computer system when executing the routine 77 of the present invention.

The computer system 71 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A computer implemented method of temporally filtering medical images during a fluoroscopy guided intervention procedure, the method performed by said computer comprising the steps of:
    providing a mask image and a fluoroscopy intervention image acquired at a current time during a medical intervention procedure;
    forming a subtraction image by subtracting said mask image from said intervention image;
    calculating a motion image of a moving structure in said subtraction image;
    forming a residual image by subtracting said motion image from said subtraction image;
    temporally filtering said residual image with a filtered image from a previous time; and
    adding said motion image to said temporally filtered residual image.

2. The method of claim 1, further comprising normalizing a contrast of the mask image and the intervention image, before forming said subtraction image.

3. The method of claim 2, wherein said contrast is normalized by calculating a log of each said image.

4. The method of claim 1, wherein said moving structure comprises a guide wire being inserted into a blood vessel during said medical intervention procedure.

5. The method of claim 1, wherein calculating a motion image comprises calculating an image that minimizes an objective function that includes a mutual information of the subtraction image and the intervention image.

6. The method of claim 5, wherein said mutual information is of the form $MI(I_{sub,t}(x,y)-I_{mov,t}(x,y), I_t(x,y)-I_{mov,t}(x,y))$, wherein $(x,y)$ is a pixel location, $I_{mov,t}(x,y)$ is said motion image, $I_{sub,t}(x,y)$ is said subtraction image, and $I_t(x,y)$ is said intervention image.

7. The method of claim 5, wherein said objective function being minimized includes term proportional to a square of said motion image.

8. The method of claim 6, wherein said mutual information is of the form $$MI(N_1, N_2) = \sum_k \|E(f_k(N_1), g_k(N_2)) - E(f_k(N_1)) \cdot E(g_k(N_2))\|^2,$$

where $f_k(N_1)=N_1^K$, $g_k(N_2)=N_2^k$ and $N_1$, $N_2$ represent the first and second arguments of said mutual information, respectively.

9. The method of claim 1, further comprising calculating a motion consistent image $$\tilde{I}_{mov,t}(x, y) = \underset{\tilde{I}_{mov,t}}{\operatorname{argmin}}(\|\tilde{I}_{mov,t}(x, y) - I_{mov,t}(x, y)\|^2 + \lambda\|\tilde{I}_{mov,t}(x, y) - \tilde{I}_{mov,t}(x, y)\|^2),$$

that constrains said motion image to be substantially constant if said moving structure is not moving, wherein $\lambda$ is a constant set to 0 when $\|I_{mov,t}(x, y) - \tilde{I}_{mov,t-1}(x, y)\| > \epsilon$, wherein $\epsilon$ is a threshold for motion detection.

10. The method of claim 1, wherein said temporal filtering takes the form $I_t(x,y) = wI_{t-1}(x,y) + (1-w)(I_{sub,t}(x,y) - I_{mov,t}(x,y))$, wherein $(x,y)$ is a pixel location, $I_{mov,t}(x,y)$ is said motion image, $I_{sub,t}(x,y)$ is said subtraction image, $I_{t-1}(x,y)$ is the filtered image from a previous time, and w is a predetermined weighting factor.

11. A computer implemented method of temporally filtering medical images during a fluoroscopy guided intervention procedure, the method performed by said computer comprising the steps of:

providing a fluoroscopy intervention image of a blood vessel acquired at a current time during a medical intervention procedure and a subtraction image of said blood vessel;

calculating a motion image that minimizes an objective function that includes a mutual information of the subtraction image and the intervention image, wherein said mutual information is of the form $MI(I_{sub,t}(x,y) - I_{mov,t}(x,y), I_t(x,y) - I_{mov,t}(x,y))$, wherein $(x,y)$ is a pixel location, $I_{mov,t}(x,y)$ is said motion image, $I_{sub,t}(x,y)$ is said subtraction image, and $I_t(x,y)$ is said intervention image;

forming a residual image by subtracting said motion image from said subtraction image; and temporally filtering said residual image with a filtered image from a previous time.

12. The method of claim 11, wherein providing said subtraction image comprises providing a mask image and forming said subtraction image by subtracting said mask image from said intervention image, wherein said mask image is provided before said intervention by injecting a contrast media into said blood vessel and acquiring an image of said highlighted vessels.

13. The method of claim 11, further comprising adding said motion image to said temporally filtered residual image.

14. A non-transitory program storage device readable by a computer, tangibly embodying a program of instructions executable by the computer to perform the method steps for temporally filtering medical images during a fluoroscopy guided intervention procedure, the method comprising the steps of:

providing a mask image and a fluoroscopy intervention image acquired at a current time during a medical intervention procedure;

forming a subtraction image by subtracting said mask image from said intervention image;

calculating a motion image of a moving structure in said subtraction image;

forming a residual image by subtracting said motion image from said subtraction image;

temporally filtering said residual image with a filtered image from a previous time; and adding said motion image to said temporally filtered residual image.

15. The computer readable program storage device of claim 14, the method further comprising normalizing a contrast of the mask image and the intervention image, before forming said subtraction image.

16. The computer readable program storage device of claim 15, wherein said contrast is normalized by calculating a log of each said image.

17. The computer readable program storage device of claim 14, wherein said moving structure comprises a guide wire being inserted into a blood vessel during said medical intervention procedure.

18. The computer readable program storage device of claim 14, wherein calculating a motion image comprises calculating an image that minimizes an objective function that includes a mutual information of the subtraction image and the intervention image.

19. The computer readable program storage device of claim 18, wherein said mutual information is of the form $MI(I_{sub,t}(x,y) - I_{mov,t}(x,y), I_{mov,t}(x,y))$, wherein $(x,y)$ is a pixel location, $I_{mov,t}(x,y)$ is said motion image, $I_{sub,t}(x,y)$ is said subtraction image, and $I_t(x,y)$ is said intervention image.

20. The computer readable program storage device of claim 18, wherein said objective function being minimized includes term proportional to a square of said motion image.

21. The computer readable program storage device of claim 19, wherein said mutual information is of the form $$MI(N_1, N_2) = \sum_k \|E(f_k(N_1), g_k(N_2)) - E(f_k(N_1)) \cdot E(g_k(N_2))\|^2,$$

where $f_k(N_1) = N_1^K$, $g_k(N_2) = N_2^k$ and $N_1$, $N_2$ represent the first and second arguments of said mutual information, respectively.

22. The computer readable program storage device of claim 14, the method further comprising calculating a motion consistent image $$\tilde{I}_{mov,t}(x, y) = \underset{\tilde{I}_{mov,t}}{\operatorname{argmin}}(\|\tilde{I}_{mov,t}(x, y) - I_{mov,t}(x, y)\|^2 + \lambda\|\tilde{I}_{mov,t}(x, y) - \tilde{I}_{mov,t-1}(x, y)\|^2),$$

that constrains said motion image to be substantially constant if said moving structure is not moving, wherein $\lambda$ is a constant set to 0 when $\|I_{mov,t}(x, y) - \tilde{I}_{mov,t-1}(X, y)\| > \epsilon$, wherein $\epsilon$ is a threshold for motion detection.

23. The computer readable program storage device of claim 14, wherein said temporal filtering takes the form $I_t(x,y) = wI_{t-1}(x,y) + (1-w)(I_{sub,t}(x,y) - I_{mov,t}(x,y))$, wherein $(x,y)$ is a pixel location. $I_{mov,t}(x,y)$ is said motion image, $I_{sub,t}(x,y)$ is said subtraction image, $I_{t-1}(x,y)$ is the filtered image from a previous time, and w is a predetermined weighting factor.

* * * * *